United States Patent
Miller

(10) Patent No.: US 8,425,748 B2
(45) Date of Patent: Apr. 23, 2013

(54) ELECTROKINETIC PUMPING OF NONPOLAR SOLVENTS USING IONIC FLUID

(75) Inventor: Seth Adrian Miller, Englewood, CO (US)

(73) Assignee: Empire Technology Development LLC, Wilmington, DE (US)

(*) Notice: Subject to any disclaimer, the term of this patent is extended or adjusted under 35 U.S.C. 154(b) by 0 days.

(21) Appl. No.: 13/572,377

(22) Filed: Aug. 10, 2012

(65) Prior Publication Data
US 2012/0305399 A1 Dec. 6, 2012

Related U.S. Application Data

(62) Division of application No. 12/720,221, filed on Mar. 9, 2010, now Pat. No. 8,262,880.

(51) Int. Cl.
*G01N 27/26* (2006.01)
*C02F 1/40* (2006.01)
*B01F 3/00* (2006.01)
*B01F 3/08* (2006.01)

(52) U.S. Cl.
USPC ............ 204/600; 204/450; 516/9; 516/21

(58) Field of Classification Search ............ 417/48; 604/19; 204/450, 456, 465, 600, 606, 607, 204/615; 516/9, 21
See application file for complete search history.

(56) References Cited

U.S. PATENT DOCUMENTS

| | | | |
|---|---|---|---|
| 5,785,831 A | 7/1998 | Bek | |
| 7,572,409 B2 | 8/2009 | Bryning et al. | |
| 2003/0052010 A1 | 3/2003 | Haswell | |
| 2004/0031685 A1 | 2/2004 | Anderson et al. | |
| 2004/0234966 A1 | 11/2004 | Bryning et al. | |
| 2005/0274617 A1 | 12/2005 | Bryning | |
| 2011/0220503 A1 | 9/2011 | Miller | |

FOREIGN PATENT DOCUMENTS

JP 2003-279536 10/2003

OTHER PUBLICATIONS

"International Search Report and Written Opinion dated May 12, 2011 for Application No. PCT/US2011/025534".
Binks, Bernard et al., "Novel Emulsions of Ionic Liquids Stabilized Solely by Silica Nanoparticles", Chem. Commun., 2003, 2540-2541.
Binks, Bernard, "Particles as Surfactants—similarities and differences", Curr. Opin. Colloid Interface Science, vol. 7, 2002, pp. 21-41.
Doku, G.N. et al., "Electric Filed-induced Mobilization of Multiphase Solution Systems Based on the Nitration of Benzine in a Micro Reactor", Analyst, 2001, 126, 14-20.
Kosmulski, Marek et al., "Electroacoustics and electroosmosis in low temperature ionic liquids", Colloids and Surfaces A: Physicochem. Eng. Aspects, vol. 267, 2005, pp. 16-18.
Urbanski, J.P. et al., "Fast Three-Dimensional Electrokinetic Pumps for Microfluidics", MIT Institute for Soldier Nanotechnologies, 2006, 1 page.

*Primary Examiner* — Luan Van
*Assistant Examiner* — Maris R Kessel
(74) *Attorney, Agent, or Firm* — Dorsey & Whitney LLP

(57) ABSTRACT

Techniques are generally described that include electrokinetic pumping an emulsion comprising an ionic fluid and a nonpolar fluid to promote flow of the ionic fluid by electroosmotic flow and drag the nonpolar fluid by viscous drag forces. In some examples, the electrokinetic pump may be utilized to deliver one or more reagents within a fluidic reactor system, such as a micro-scale reactor system. In some additional examples, a reagent may be dissolved in the nonpolar fluid of a first emulsion and pumped through the electrokinetic pump to a mixing channel to allow the reagent of the first emulsion to react with a reagent of second emulsion to form a reactive product.

13 Claims, 3 Drawing Sheets

ELECTROKINETIC PUMPING OF NONPOLAR SOLVENTS USING IONIC FLUID

CROSS-REFERENCE TO RELATED APPLICATION

This application is a divisional of U.S. patent application Ser. No. 12/720,221, filed Mar. 9, 2010. This application is incorporated by reference herein in its entirety and for all purposes.

BACKGROUND

Unless otherwise indicated herein, the materials described in this section are not prior art to the claims in this application and are not admitted to be prior art by inclusion in this section.

Micro-scale reaction systems commonly use electrokinetic pumps to deliver controlled amounts of reagents. Electrokinetic pumps convert electrical potential to hydraulic power. In particular, electrokinetic pumps comprise a channel with spaced apart electrodes disposed at each end of the channel. A polar solvent may be delivered to the channel. When a voltage difference is applied to the spaced apart electrodes, the electrical potential promotes the flow of the polar solvent through the channels.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings.

In the drawings.

DETAILED DESCRIPTION

Figure 1:
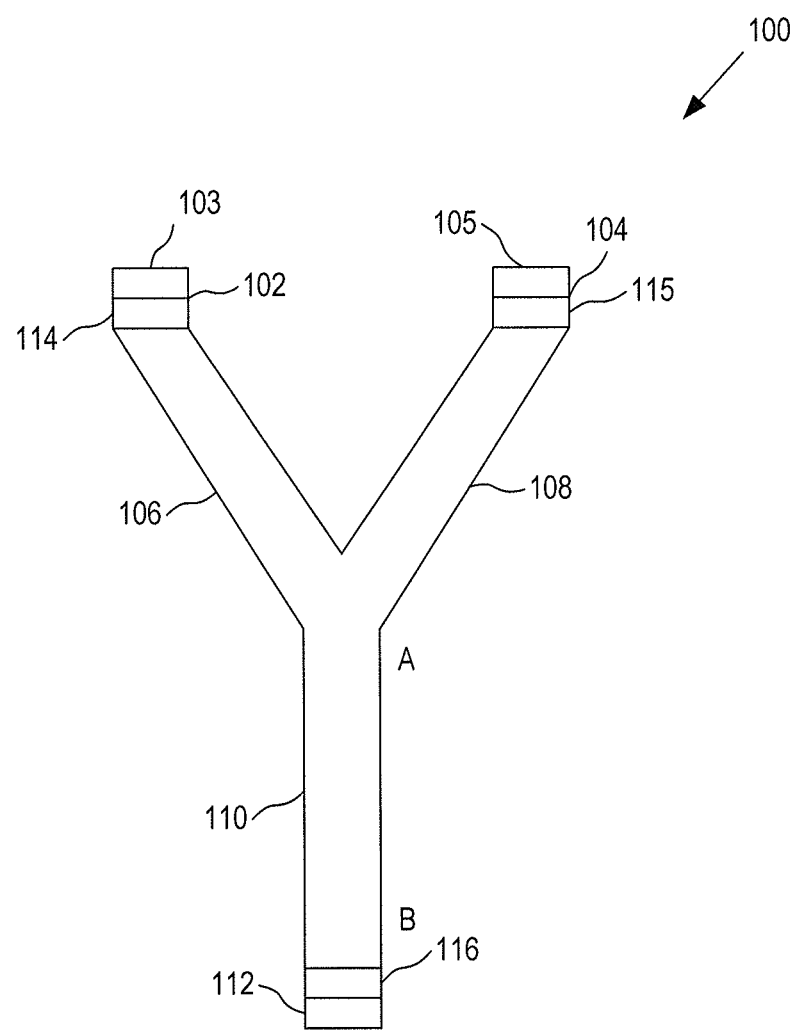
FIG. 1 is a schematic illustration of an electrokinetic pump.

The following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, devices, and/or apparatus generally related to electrokinetic pumping an emulsion comprising an ionic fluid and a nonpolar fluid to promote flow of the ionic fluid by electro-osmotic flow and drag the nonpolar fluid by viscous drag forces. In some examples, the electrokinetic pump may be utilized to deliver one or more reagents within a fluidic reactor system, such as a micro-scale reactor system. In some additional examples, a reagent may be dissolved in the nonpolar fluid of a first emulsion and pumped through the electrokinetic pump to a mixing channel to allow the reagent of the first emulsion to react with a reagent of second emulsion to form a reactive product.

In some examples, a reactor system may comprise one or more electrokinetic pumps. An electrokinetic pump may include a first channel having an inlet and an outlet, a first electrode positioned proximate the inlet, and a second electrode positioned proximate the outlet. The inlet of first channel may be adapted to receive an emulsion. The emulsion may include an ionic fluid, a nonpolar fluid, and/or a reagent. The electrokinetic pump may be configured to promote flow of the emulsion through the first channel when a voltage difference is applied between the first and the second electrodes. In particular, the voltage difference promotes flow of the ionic fluid by electro-osmotic flow, and as the ionic fluid flows through the first channel, the ionic fluid drags the nonpolar fluid by viscous forces.

In some embodiments, a first emulsion may mix with a second emulsion in a mixing channel. A reagent from the first emulsion may react with a reagent from a second emulsion to form a reactive product. In one example, the reagent in the first or second emulsion may be the nonpolar fluid. In another example, a dissolved substance in the nonpolar fluid of the first emulsion may comprise the first reagent and/or a dissolved substance in the nonpolar fluid of the second emulsion comprises the second reagent. In some examples, a stabilizing agent may be applied to the emulsion to maintain the emulsion. After exiting the electrokinetic pump, the stabilizing agent may be removed from the emulsions and the reactive product may be removed. Additionally, the ionic fluid may be removed and reused.

FIG. 1 is a schematic illustration of a reactor system 100 comprising an electrokinetic pump arranged in accordance with at least some examples of the present disclosure. The example reactor system 100 may be a micro-scale reactor system that utilizes a micro-scale electrokinetic pump to deliver one or more reagents to a mixing zone to form a reactive product. The example reactor system 100 may comprise a first inlet 102 coupled to a first reservoir 103 and a second inlet 104 coupled to a second reservoir 105. A first electrode 114 and a second electrode 115 may be positioned in the reactor system 100 so that the electrode is in electrical communication with a fluid within the reactor system 100. For instance, in some examples the first electrode 114 may be positioned proximate the first inlet 102, and the second electrode 115 may be positioned proximate the second inlet 104. In other examples, the first electrode 114 may be positioned in the first reservoir 103 and the second electrode 115 may be positioned in the second reservoir 105. The first inlet 102 may be in fluid communication with a first channel 106, and the second inlet 104 may be in fluid communication with a second channel 108. The first channel 106 and the second channel 108 may be combined at a first end of a third channel 110. A second end of the third channel 110 may be coupled to an outlet 112. The outlet 112 may be coupled to third reservoir (not shown) or another component in a fluid system (not shown). A third electrode 116 may be positioned proximate the outlet 112 or in some examples, positioned in the third reservoir. Between point A and point B on the third channel 110 comprises a mixing zone. As indicated above, in some examples the reactor system is a micro scale reactor. In these examples, the channels may have a diameter in the millimeters and/or micrometers.

In one example, the first and second reservoirs 103 and 105 may each be configured to mix a respective emulsion comprising an ionic fluid and a nonpolar fluid. That is, the ionic fluid is immissible and unreactive with the nonpolar fluid. The nonpolar fluids may be any liquid or gas that cannot be pumped using electro-osmotic flow. In some examples, the nonpolar fluid comprises an organic solvent, such as hexane, toluene or linear ethers.

In general, when two immiscible materials are mixed to create an emulsion, the emulsion may be unstable and the two materials may separate over time. Thus, in some examples a stabilizing agent may be added to stabilize the emulsion. That is, a stabilizing agent may be added to the emulsion to keep the two fluids in its emulsion state. The stabilizing agent may comprise one or more of a surfactant, a plurality of nanoparticles, such as fumed silica nanoparticles, and/or any other agent capable of stabilizing the emulsion. Example stabilizing agents are described in Bernard P. Binks, et al., *Novel Emulsions of Ionic Liquids Stabilized Solely by Silica Nanoparticles*, Chem. Commun., 2003, 2540-2541, which is incorporated by reference herein in its entirety for all purposes. In many examples, the nonpolar fluid may comprise a dissolved reagent that is to react with another reagent in the mixing zone between point A and B on the third channel.

In some examples, rather than mixing the emulsion in the first and second reservoirs 103 and 105, the first and second reservoirs 103 and 105 may be adapted to receive premixed emulsions. The first and second emulsions may be mixed in the first and second reservoirs 102 and 104, respectively or may be mixed prior to entering its respective reservoir. The first inlet 102 may be configured to receive a first emulsion from the first reservoir 103. The second inlet 104 may be configured to receive a second emulsion from the second reservoir 105. A power source (not shown) may be coupled to the reactor system 100. The power source may be adapted to apply a voltage differential between the first electrode 114 and the third electrode 116, and a voltage differential between the second electrode 115 and the third electrode 116. For instance, the first and second electrodes 114 and 115 may have a voltage that is higher than the voltage of the third electrode to produce a voltage difference between the first inlet 102 and the outlet 112 and the second inlet 104 and the outlet 112. The voltage difference may be any voltage difference sufficient to promote the flow of the emulsions to the outlet 112.

A first electric potential may be applied between the first electrode 114 and the third electrodes 116 to create an electro-osmotic force adapted to drive polar molecules from the first inlet 102 to the outlet 112. A second electric potential may be applied between the second electrode 115 and the third electrode 116 to create an electro-osmotic force adapted to drive polar molecules from the first inlet 102 to the outlet 112. In particular, the first electrical potential drives the ionic fluid from the first inlet 102 to the outlet 112, and the second electrical potential drives the ionic fluid from the second inlet 104 to the outlet 112. Because the ionic fluids in the first and second reservoirs 102 and 104 each formed a first and second emulsions with a respective nonpolar fluid, the ionic fluids drags its respective nonpolar fluid with it by viscous forces. In one example, the ionic fluid is the dominant material in the first and/or second emulsion. For instance, in one example the amount of ionic fluid in either the first or second emulsion is an amount sufficient to maintain a cohesive conductive path between the electrodes.

As the ionic fluid in the first emulsion drags the nonpolar fluid from the first inlet 102, the first emulsion passes through the first channel 106 and into the third channel 110. As the ionic fluid in the second emulsion drags the nonpolar fluid from the second inlet 104, the second emulsion passes through the second channel 108 and into the third channel 110. While both the first and second emulsion are in the third channel 110, a reactant in the first emulsion may react with a reactant in the second emulsion in the mixing zone between points A and B to form a reactive product. As indicated above, a reactant may be one or more dissolved reagents in the nonpolar fluid or may be the nonpolar fluid itself. In some examples, the reagent may be one or more of Grignards, $AlCl_3$, DCC, or other similar reagents. In some examples, the reagent may be may be water sensitive. That is, water may be a competing reactant to a reagent. In order to control the amount of water in an emulsion, in some examples, prior to mixing the first and second emulsions in the mixing zone, one or both emulsions may be passed through a drying agent to eliminate water in the emulsions. For instance, a drying agent may be provided in first and second reservoirs 102 and 104 or on channels 106 and 108. In some examples, the first and second reagents may pass through microporous silica first to minimize pressure variations in the system.

Once a reaction takes place between points A and B in the mixing zone, the first and second emulsions may exit the system 100 at outlet 112. Upon exiting the system at the outlet 112, the first and second emulsions may be provided to a collection reservoir (not shown). The collection reservoir may be included in the example reactor system 100 or may be separate from the reactor system. In the collection reservoir the first and second emulsions may be broken to separate the ionic fluid from the organic solvent. In some examples, the first and second emulsions may be broken by removing the stabilizing agent. In other examples, the emulsion may be broken by filtration, such ultrafiltration, by adding water to the emulsions, such as when a water soluble ionic fluid is used, by heating and/or cooling the system, or any other method capable of breaking an emulsion. Once the emulsion is broken, the reactive product may be separated from the organic solvent. For instance, in some examples the organic solvent may be removed utilizing stripping techniques, such as by utilizing a vacuum process like rotary evaporation. In other examples, a second solvent may be added the first and second emulsions that precipitates the reactive product, which may then be collected by filtration. The second solvent may be added to the first and second emulsions before the emulsions are broken or after the emulsions are broken. Additionally, the ionic fluid may be separated from the organic solvent and may be recycled and reused. For instance, the ionic fluid may be cycled back through an electrokinetic pump in the reactor system 100 for reuse.

Figure 2:
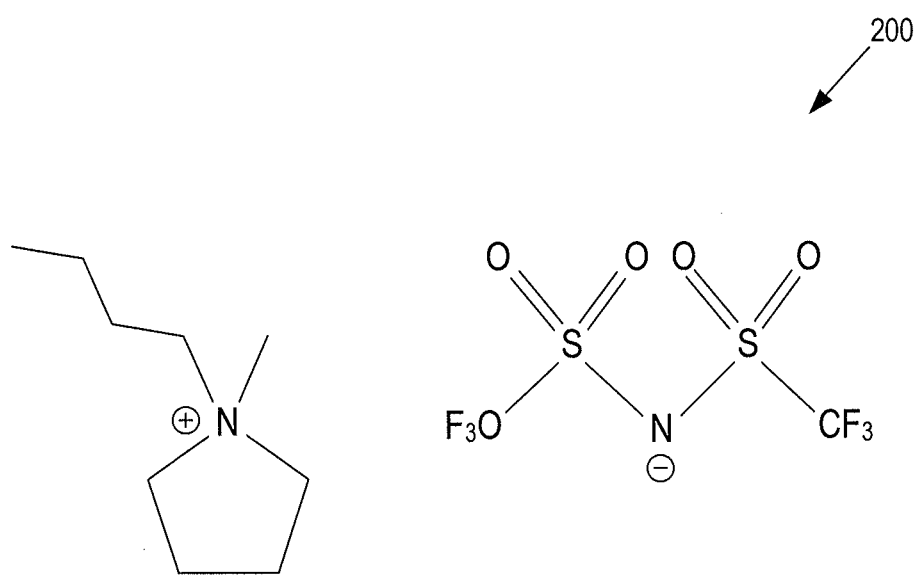
FIG. 2 is a molecular diagram for an example ionic fluid.

In one example, the ionic fluid comprises butyl methylpyrrolidinuum bis(triflimide) (BMP-TFSI). FIG. 2 is a molecular diagram 200 for an example ionic fluid in accordance with at least one example of the present disclosure. The example ionic fluid may be used to form an emulsion when mixed with a nonpolar fluid as described above. Butyl methylpyrrolidinuum bis(triflimide) has low water content, low viscosity, and is a simple quaternary ammonium salt and is extremely stable to many different chemical reagents that may be dissolved in the nonpolar fluid. Other possible ionic fluids are described in Marek Kosmulski, et al., *Electroacoustics and electroosmosis in low temperature ionic liquids*, Cooloids and Surface A: Physicochemical and Engineering Aspects, Volume 267, Issues 1-3, October 1005, p. 16-18, which is incorporated by reference herein in its entirety for all purposes.

Figure 3:
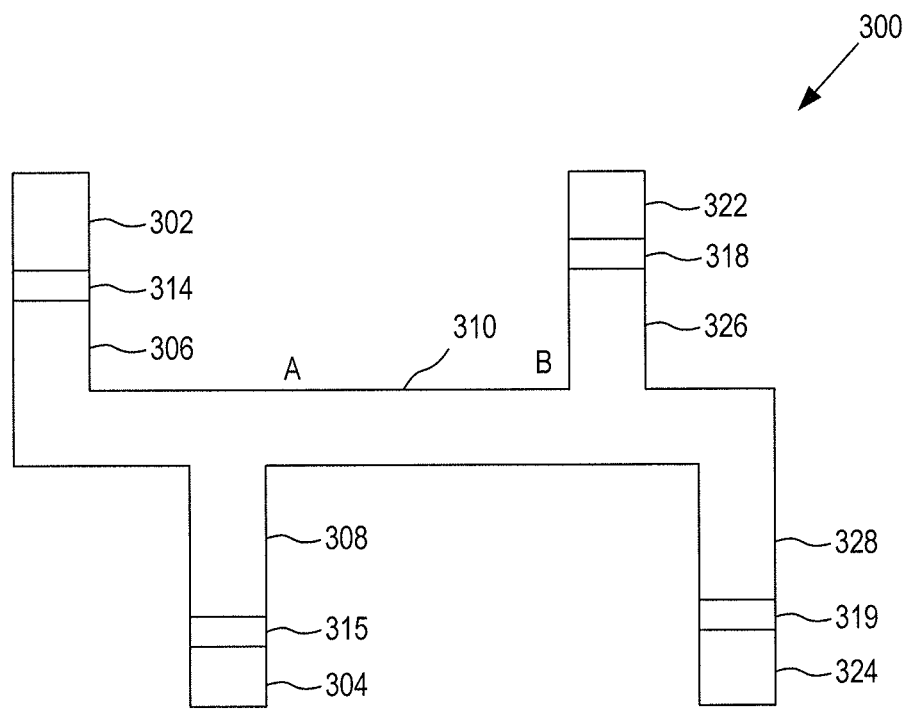
FIG. 3 is a schematic illustration of an electrokinetic pump.

FIG. 3 is a schematic illustration of a reactor system 300 arranged in accordance with at least some examples of the present disclosure. The example reactor system 300 includes two separate electrokinetic pumps rather than two combined electrokinetic pumps as illustrated FIG. 1 in the example reactor system 100. The example reactor system 300 includes a first reservoir 302 and a second reservoir 304. The first reservoir 302 may be in fluid communication with an inlet of a first channel 306, and the second reservoir may be in fluid communication with an inlet of a second channel 308. The first reservoir 302 and/or the inlet of the first channel 306 may comprise a first electrode 314 that is configured so that the first electrode 314 may be in electrical communication with a fluid, such as an emulsion, therein. The second reservoir 304 and/or the inlet of the second channel 308 may comprise a second electrode 315 so that the second electrode 315 may be in electrical communication with a fluid, such as an emulsion, therein. The first and second channels 306 and 308 may combine into a third channel 310. The third channel 310 may comprise a mixing zone for mixing reactants provided from the first and second reservoirs 302 and 304. The third channel 310 may be in fluid communication with a fourth channel 326 and a fifth channel 328. The fourth channel 326 may comprise a third electrode 318 and a first outlet 322. The fifth channel 328 may comprise a fourth electrode 319 and a second outlet 324. In some examples, the first outlet 322 is coupled to may be third reservoir (not shown) and the second outlet 324 may be coupled to a fourth reservoir (not shown). In these examples, the third electrode 318 may be positioned in the third reservoir and the fourth electrode 319 may be positioned in the fourth reservoir.

The first and second reservoirs 302 and 304 may comprise a first and second emulsion, respectively, as is described in reference to the emulsions in the reactor system 100 in FIG. 1. A power source (not shown) may be coupled to the reactor system 300 and adapted to apply a first voltage differential between the first electrode 314 and the third electrode 318. The power source may be further adapted to apply a second voltage differential between the second electrode 315 and the fourth electrode 319. The first voltage differential drives the ionic fluid from the first reservoir 302 to the outlet 322, and the second voltage differential drives the ionic fluid from the second reservoir 304 to the outlet 324. The ionic fluids in each of the first and second reservoirs, 302 and 304, drag the nonpolar fluid from its emulsion by viscous force.

In other examples, more electrokinetic pumps may be adapted to move and mix more than two components and thus include more than two reservoirs and corresponding channels. In general the number of reservoirs may depend on the number of reactants to be supplied to the mixing zone for reacting. In some examples, not all electrodes may have a voltage applied so that less than the number of reservoirs comprising an emulsion will be supplied to the mixing zone.

Figure 4:
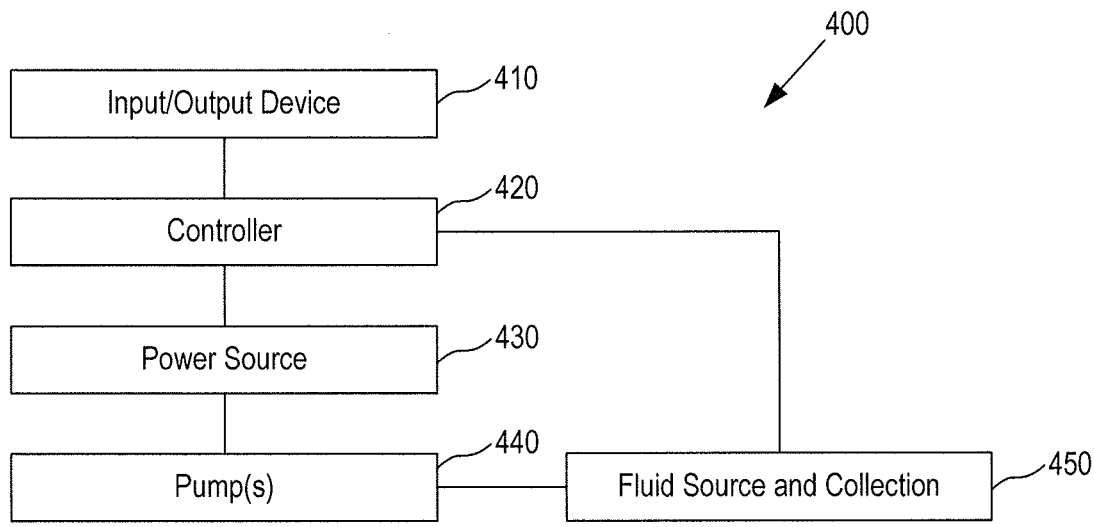
FIG. 4 is a system diagram.

FIG. 4 is a system diagram 400 that may comprise at least one electrokinetic pump arranged in accordance with at least some examples of the present disclosure. The example system 400 may include an input/output device 410, a controller 420, power source 430, at least one electrokinetic pump 440, and a fluid source and collection 450. The controller 420 may be coupled to the input/output device 410, the power source 430, and the fluid source and collection 450. The controller 420 may be adapted to selectively control the amount of fluid delivered to the at least one electrokinetic pump 440 by providing one or more control signals to the fluid source and collection 450. In response to the one or more control signals, the fluid source may provide an emulsion as described above to an inlet of an electrokinetic pump 440 or to a reservoir. The electrokinetic pump 440 may include a plurality of electrokinetic pumps that interact to form a reactor system, such as the reactor system described in FIGS. 1 and 3. Alternatively, more than two electrokinetic pumps 440 may be coupled together to form a reactor system. The reactor system may include any number of channels, electrodes, mixing channels, and/or reservoirs.

The controller may be adapted to selectively provide power to the electrokinetic pump 440 by providing one or more control signals to the power source 430. In response to the one or more control signals, the power source 430 may be configured to apply a voltage (or a plurality of voltages) to one or more electrodes in one or more of the electrokinetic pumps 440. Additionally, the controller 420 may be adapted to control the amount of time to which time the power source 430 applies voltage(s) to the electrodes.

An outlet of the fluid source and collection 450 may be in fluid communication with an outlet, an inlet, or reservoir of one or more electrokinetic pumps 440. The fluid source and collection 450 may comprise one or more reservoirs adapted to receive and/or provide a fluid, such as an emulsion. The fluid source and collection 450 may comprise emulsions already mixed and stabilized. Alternatively, the fluid source and collection 450 may comprise individual fluids unmixed that are provided to a reservoir in an electrokinetic pump 440 for mixing. The controller 420 may be coupled to the fluid source and collection 450 and adapted to control the amount of fluid provided to a respective electrokinetic pump 440.

The input/output device 410 may be any device adapted to input and/or output information. Example input devices may include keyboard, mouse, pen, voice input device, touch input device, or any other input device, such as peripheral devices like a scanner. Example output devices include as a printer, graphics processing unit, or an audio processing unit, which may be configured to communicate to various external devices such as a display or speakers via one or more output ports.

Figure 5:
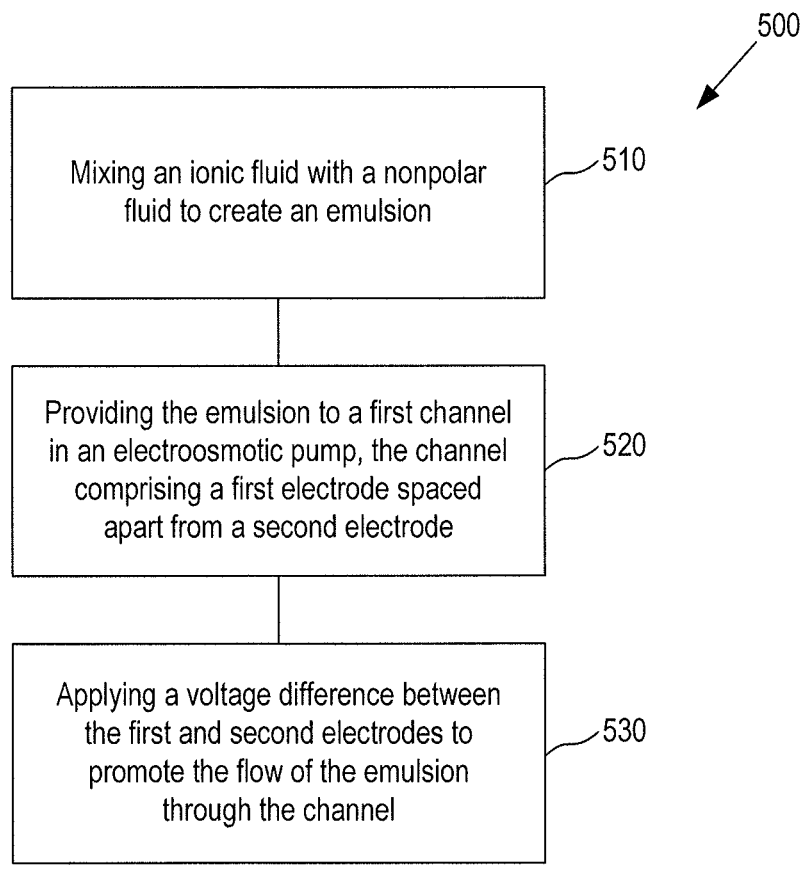
FIG. 5 is a flow chart illustrating a method of carrying a nonpolar fluid through an electro-osmotic pump; all arranged in accordance with at least some examples of the present disclosure.

FIG. 5 is a flowchart illustrating a method 500 of carrying a nonpolar fluid through an electro-osmotic pump in accordance with at least some examples of the present disclosure. The method 500 may include one or more functions, operations, or actions as is illustrated by one or more of blocks 510, 520, and/or 530. The example method 500 may begin at block 510.

In block 510, the method may include mixing an ionic fluid with a nonpolar fluid to create an emulsion. Block 510 may be followed by block 520.

In block 520, the method may include providing the emulsion to a first channel in an electro-osmotic pump. The channel may comprise a first electrode spaced apart from a second electrode. Block 520 may be followed by block 530.

In block 530, the method may include applying a voltage difference between a first electrode spaced apart from a second electrode to promote flow of the emulsion through the channel. The method 500 may be performed in an order or combination other than is illustrated and may include steps not shown. It will thus be appreciated that in some examples various blocks may be eliminated, divided into additional blocks, and/or combined with other blocks. For instance, the ionic fluid may be mixed with the nonpolar fluid to create the emulsion at the same time that the voltage is applied to the first electrode.

The present disclosure is not to be limited in terms of the particular examples described in this application, which are intended as illustrations of various aspects. Many modifications and examples can may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A system comprising:
    a fluid source comprising a first and second emulsion, the first and second emulsions each comprising an ionic fluid, a nonpolar fluid, and a respective reagent;
    an electrokinetic pump coupled to the fluid source, the electrokinetic pump comprising a first channel and a second channel that are combined to form a mixed channel, a first electrode proximate the first channel, a second electrode proximate the second channel, a third electrode proximate the mixed channel, the first and second channels being arranged in fluid communication with the fluid source and adapted to receive the first and second emulsions, respectively;
    a power source coupled to the electrokinetic pump and adapted to apply a first voltage difference between the first electrode and the third electrode to promote flow of the first emulsion through the first channel and the mixed channel, wherein the power source is further adapted to apply a second voltage difference between the second electrode and the third electrode to promote flow of the second emulsion through the second channel and the mixed channel, while the first emulsion and the second emulsion are in the mixed channel the reagent from the first emulsion is adapted to react with the reagent from the second channel to create a reactive product; and
    a controller coupled to the power source and the fluid source, wherein the controller is adapted to control the amount of the first and second emulsions supplied to the electrokinetic pump and adapted to control the first and second voltage differences applied by the power source.

2. The system of claim 1 wherein the reagent from the first emulsion and the reagent from the second emulsion comprise a substance dissolved in its respective nonpolar fluid.

3. The system of claim 1 wherein the nonpolar fluid in at least one of the first and second emulsions comprises an organic solvent.

4. The system of claim 1 further comprising a fluid collection device arranged in fluid communication with an output of the mixed channel, the fluid collection device being adapted to receive the first and second emulsions from the output of the mixed channel and also arranged to break the first and second emulsions, the fluid collection device being adapted to remove the reactive product and separate the ionic fluid from the nonpolar fluid.

5. The system of claim 4 wherein the fluid collection device is adapted to break the first and second emulsions by one or more of removing a stabilizing agent from the emulsions, filtering the emulsions, adding water to the emulsions, heating the emulsions, cooling the emulsions, or any combination thereof.

6. The system of claim 1, wherein at least one of the first and second emulsions comprises a stabilizing agent.

7. The system of claim 1, wherein the ionic fluid of the first emulsion, the second emulsion, or both comprises butyl methypyrrolidinuum bis(triflimide).

8. The system of claim 1, wherein the nonpolar fluid of the first emulsion, the second emulsion, or both comprises at least one of hexane, toluene or a linear ether.

9. The system of claim 1, wherein the fluid source includes a first reservoir and a second reservoir.

10. The system of claim 9, wherein the first electrode is positioned in the first reservoir and the second electrode is positioned in the second reservoir.

11. The system of claim 9, wherein at least one of the first and the second reservoirs is configured to mix respective ones of the first and second emulsions.

12. The system of claim 1, wherein the first voltage difference is equal to the second voltage difference.

13. The system of claim 4, wherein the fluid collection device is in fluid communication with the fluid source for cycling the ionic fluid back to the fluid source.

* * * * *

UNITED STATES PATENT AND TRADEMARK OFFICE
CERTIFICATE OF CORRECTION

PATENT NO. : 8,425,748 B2  
APPLICATION NO. : 13/572377  
DATED : April 23, 2013  
INVENTOR(S) : Miller Page 1 of 1

It is certified that error appears in the above-identified patent and that said Letters Patent is hereby corrected as shown below:

On the Title Page, item (56), under "OTHER PUBLICATIONS", in Column 2, Line 8, delete "Benzine" and insert -- Benzene --, therefor.

In the Specifications:

In Column 3, Line 4, delete "immissible" and insert -- immiscible --, therefor.

In Column 4, Lines 50-51, delete "methylpyrrolidinuum" and insert -- methylpyrrolidinium --, therefor.

In Column 4, Lines 55-56, delete "methylpyrrolidinuum" and insert -- methylpyrrolidinium --, therefor.

In Column 4, Line 61, delete "Cooloids" and insert -- Colloids --, therefor.

In the Claims:

In Column 10, Lines 47-48, in Claim 7, delete "methypyrrolidinuum" and insert -- methylpyrrolidinium --, therefor.

Signed and Sealed this  
Sixteenth Day of July, 2013

Teresa Stanek Rea  
*Acting Director of the United States Patent and Trademark Office*